May 15, 1951 — E. M. LYCKE — 2,553,264
GAUGE FOR DOUGHNUT MACHINES
Filed Feb. 6, 1948
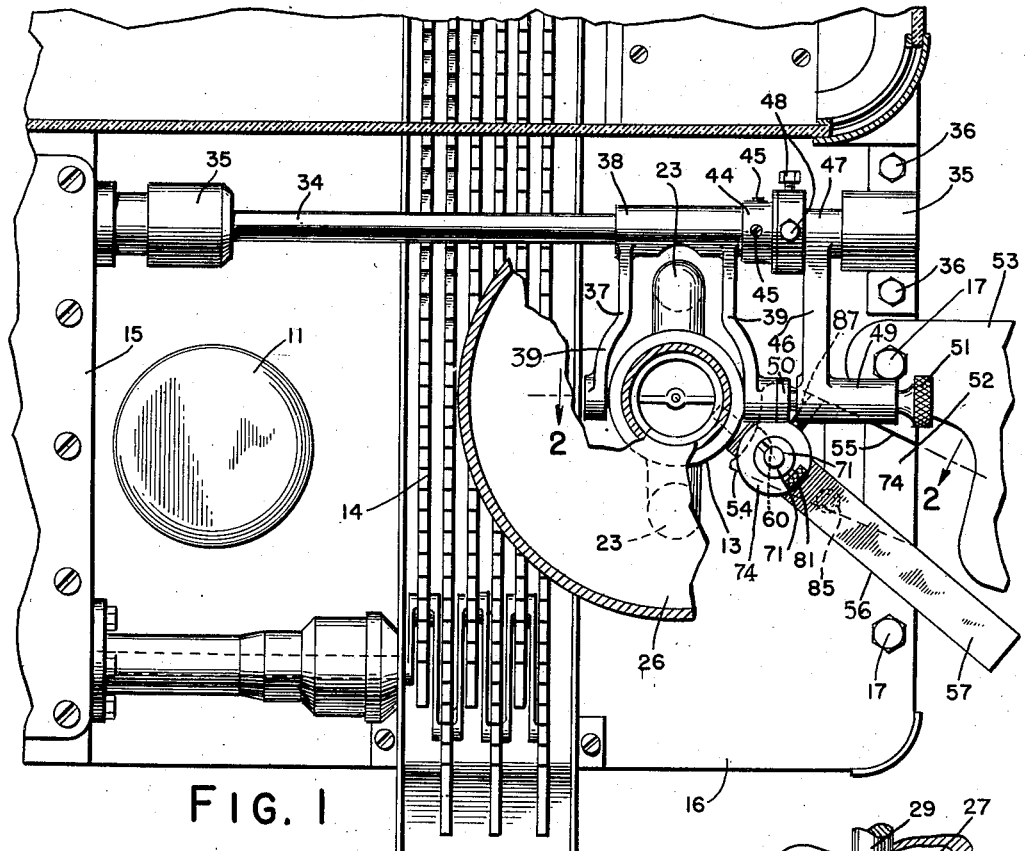
FIG. 1
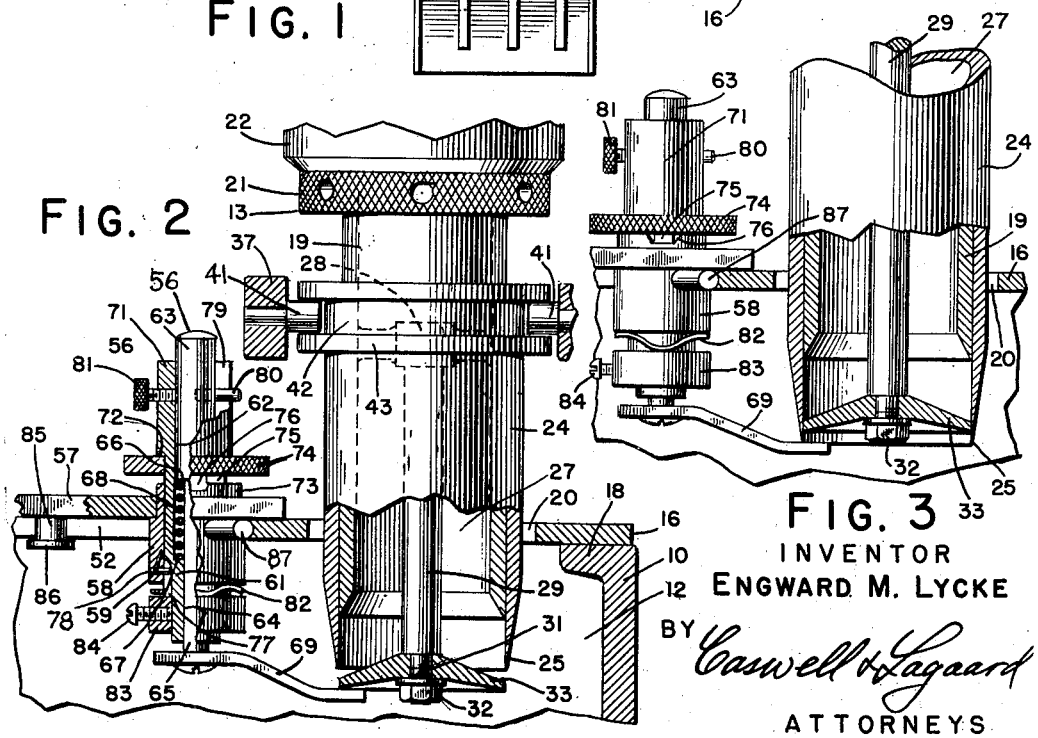
FIG. 2
FIG. 3
INVENTOR
ENGWARD M. LYCKE
BY Caswell & Lagaard
ATTORNEYS Patented May 15, 1951

2,553,264

UNITED STATES PATENT OFFICE 2,553,264

GAUGE FOR DOUGHNUT MACHINES

Engward M. Lycke, Minneapolis, Minn., assignor to Pillsbury Mills, Inc., Minneapolis, Minn., a corporation of Delaware Application February 6, 1948, Serial No. 6,703

1 Claim. (Cl. 33—181)

My invention relates to doughnut machines and to the cutters thereof and particularly to a cutter having a fixed head with an annular blade movable downwardly past the head when moving into cutting position.

An object of the invention resides in providing a gage for use in connection with the cutter for setting the same to cause the blade to extend past the head a predetermined distance when in its extreme cut off position.

Another object of the invention resides in providing the gage with a vertically extending guide and a movable engaging member guided for movement therein together with movement limiting means for limiting the movement of the engaging member to a position away from the head a distance equal to the projection of the blade beyond the head when the blade is in its extreme cut of position.

An object of the invention resides in mounting a sleeve for longitudinal movement in said guide and in adjustably supporting said engaging member for movement in the sleeve.

Another object of the invention resides in providing motion limiting means between said sleeve and guide for allowing said sleeve to move a distance equal to the projection of the cutting edge of the cutter blade beyond the cutter head when the blade is in cut off position.

Another object of the invention resides in providing resilient means for urging the sleeve into its position corresponding with the cut off position of the cutter blade.

A still further object of the invention resides in providing a wheel encircling said sleeve and bearing on one side against said engaging member and in further providing said guide with a rim having a notch therein and said wheel with a lug adapted to ride on said rim to retain said engaging member in its uppermost position or to enter said notch and hold said engaging member in its lowermost position.

Other objects of the invention reside in the novel combination and arrangement of parts and in the details of construction hereinafter illustrated and/or described.

In the drawing:

Fig. 1 is a plan view of a portion of a doughnut machine illustrating an embodiment of my invention applied thereto.

Fig. 2 is a fragmentary sectional view taken on line 2—2 of Fig. 1 and drawn to a greater scale.

Fig. 3 is a view similar to Fig. 2 showing the parts in altered position.

In the use of doughnut machines employing a cutter having a fixed head with an annular cutting blade having an edge adapted to be moved into engagement with the head to sever the dough extrusions, considerable difficulty has been encountered in producing proper adjustment of the blade with respect to the head. The instant invention overcomes this difficulty by providing a gage for use in the setting of the blade whereby the blade can be quickly and accurately set so as to function in the desired manner.

For the purpose of illustrating my invention I have shown in the drawings a portion of a doughnut machine such as disclosed in the patent to Holmes et al. Patent No. 2,320,037, issued May 25, 1943. Since the instant invention relates particularly to the cutter for the doughnut machine, only as much thereof as illustrates the invention has been shown in the drawings and reliance is had on said patent for the remaining features of the doughnut machine.

The doughnut machine illustrated includes a cooking kettle 10 having a way 12 in which a suitable heated cooking liquid is progressed by means of a motor driven impeller 11. Annular dough extrusions are deposited in the way 12 by means of a cutter indicated in its entirety by the reference number 13 and are caused to cook while being progressed along the way. The doughnuts during cooking are inverted and are finally removed from the machine by means of an ejector 14. The cutter 13 and ejector 14 are driven from a transmission contained within a transmission case 15.

Overlying the upper edge of the kettle 10 is a top 16 which is secured thereto by means of cap screws 17 screwed into a flange 18 extending inwardly from the upper edge of the said kettle. The impeller 11, cutter 13 and the ejector 14 are all mounted on this top.

The cutter 13 includes a tubular member 19 having a passageway 27 therethrough. Formed on this member is a collar 21. This collar is screwed into a mounting 22 which is attached to legs 23 secured to the upper surface of the top 16. Slidably mounted on the tubular member 19 is an annular blade 24 which is formed at its lower end with an annular cutting edge 25. The mounting 22 serves to support a dough receptacle 26 in which the raw dough is placed and which is in communication with the passageway 27 within the tubular member 19. Extending across said tubular member near its upper end is a bridge 28. A stem 29 is secured to this bridge and projects downwardly therefrom and is located centrally with respect to said tubular member. The lower end of the said stem is formed with a reduced portion 31 which is threaded to receive a nut 32. Mounted on the reduced portion 31 of the stem 29 is a cutter head 33 which is in the form of a disc and which cooperates with the cutting edge 25 of the blade 24. The lower end of the cutter 13 extends through an opening 20 in the top 16 so that the dough extrusions may be deposited into the cooking liquid in the way 12. The receptacle 26 is placed under pressure by compressed air and when the blade 24 is raised in an amount sufficient to clear the said head as shown in Fig. 2, dough is extruded from between the upper surface of said head and the cutting edge 25. When the blade 24 is lowered to the position shown in Fig. 3, the extruded part of the dough is cut off and is dicharged into the cooking liquid flowing along the way 12 in the kettle 10. It has been found that the cutting edge 25 when in its cut off position must extend somewhat below the head 33 in order to effect positive severance of the extruded dough formation from the cutter.

The cutter 13 is driven in the following manner. A shaft 34 is connected by means of a coupling 35 to another shaft disposed within the transmission case 15 and oscillated back and forth by suitable mechanism within said case. The shaft 34 is journaled in an outboard bearing 35 which is attached to the top 16 by means of screws 36. Rotatably mounted on the shaft 34 is a fork 37 which has a boss 38 bored to receive the said shaft. Said fork includes arms 39 which straddle the blade 24 and which have pins 41 extending inwardly therefrom. These pins are adapted to engage within a groove 42 formed in a collar 43 disposed at the upper end of said blade. When the fork 37 is reciprocated by means of the shaft 34, blade 24 is caused to raise and lower from the position shown in Fig. 2 to that shown in Fig. 3 and vice versa to cause the formation of the dough extrusions. Adjoining the boss 38 is a sleeve 44. This sleeve is secured to the shaft 34 by means of set screws 45. An arm 46 has a hub 47 formed on the same which is also rotatably mounted on the shaft 34. This hub extends into the sleeve 44 and may be adjustably clamped thereto by means of a number of set screws 48 which are threaded into said sleeve and which engage said hub. The arm 46 is constructed with a guide 49 in which is slidably mounted a bolt 51. This bolt is adapted to engage a portion 50 on the fork 37 and when in engagement therewith forms a drive for the said fork.

For the purpose of inspecting the dough extrusions discharged from the cutter 13 an inspection hole 52 is cut into the top 16. This inspection hole is adapted to be closed by means of a cover 53 which is pivoted to the top 16 by means of one of the cap screws 17 used for holding the said top attached to the kettle 10. The hole 52 is elongated in form providing two oppositely facing edges 54 and 55 in the said top leading up to the cutter 13 and an end edge 60.

The invention proper consists of a gage indicated in its entirety by the reference numeral 56. This gage includes a bar 57 which serves as a mounting for the gage and has attached to it a vertical guide 58 having a bore 59 therein. In the bore 59 is slidably mounted a sleeve 61. This sleeve is itself formed with a bore 62 in which is slidably mounted a plunger 63. The bore 62 of the sleeve 61 is reduced in diameter at its lower end as indicated at 64 while the lower end 65 of the plunger 63 is likewise reduced to slide within the bore 64. By means of this construction a shoulder 66 is formed on the plunger 63 while a similar shoulder 67 is formed within the sleeve 61. A compression coil spring 68 is disposed in the space between the bore 62 and the reduced end 65 of plunger 63 and is seated against the two shoulders 66 and 67. Said spring serves to move the plunger 63 upwardly.

Attached to the lower end 65 of the plunger 63 is an arm 69 which is adapted to underlie the head 33 of cutter 13 as shown in Fig. 2. The upper end of the sleeve 61 is formed with a head 71. This head is somewhat larger than the said sleeve and provides a shoulder 72 which is spaced from a rim 73 formed on the upper end of the guide 58. Between this shoulder and the said rim is disposed a thumb wheel 74 which is rotatable on the said sleeve. Wheel 74 has a lug 75 formed on the underside of the same which is adapted to ride upon the upper edge of rim 73 or to enter a notch 76 in the edge of said rim 73.

The plunger 63 is held from rotation relative to the guide 58 by means of the following construction. Formed in the lowermost portion of the sleeve 61 is a key way 77. A pin 78 extending through the guide 58 engages the key way 77 and restrains rotation of the sleeve 61. Formed in the head 71 of said sleeve is another key way 79. A pin 80 extends through this key way and is driven in to the upper end of the plunger 63 and holds the plunger from rotation with respect to the sleeve. In this manner the arm 69 is held from rotation with respect to the bar 57. The plunger 63 may be adjustably supported within the sleeve 61 by means of a thumb screw 81 which is threaded into the head 71 of said sleeve and which is adapted to engage the enlarged portion of said plunger.

Relative motion is procured between the guide 58 and the sleeve 61 by means of a krinkle spring 82 which is disposed between the lower end of the guide 58 and a collar 83 secured to the lowermost end of the sleeve 61 by means of a set screw 84.

The gage 56 is held attached to the doughnut machine as best shown in Fig. 1. For this purpose a button 85 is employed which is attached to the underside of the bar 57. This button has a flange 86 which is adapted to underlie the under surface of the top 16, and to hook under the same as shown in dotted lines in Fig. 1. A pin 87 secured to the guide 58 extends outwardly therefrom and is adapted to engage the edge 55 of the top 16 formed by the hole 52. When the device is mounted as shown in Fig. 1, the guide 58 engages the edge 54 of top 16 while the pin 87 is disposed in proximity to the edge 55 of said top. This restrains lateral movement of the gage. Upward movement of the gage is restrained by means of the flange 86, on button 85.

The use of the invention is as follows: When it is desired to adjust the position of the blade 24 of the cutter, the bolt 51 is brought into engagement with the part 50 of the fork 37 and the transmission operated until the cutter blade 24 is at its lowermost or cut off position. The transmission is then arrested and set screws 48 loosened. The blade 24 is thereafter elevated above the head 33 as shown in Fig. 2. Cover 53 may then be swung aside to clear opening 52. Gage 56 is next applied to the top 16. This is accomplished as follows. Lug 75 is withdrawn from notch 76 by pulling upwardly on the wheel 74 and caused to ride on the rim 73 by giving said wheel partial rotation. The screw 81 is next loosened and the plunger 63 lowered so that the arm 69 will be well below the lower edge of the head 33 of cutter 13 after which screw 81 is tightened. The gage is then held in a position rotated counter clock-wise from its position shown in Fig. 1 so that the flange 86 on button 85 lies inwardly of the outer edge of the top 16, and then inserted in the hole 52. Bar 57 is caused to rest upon the top 16 and the gage slid inwardly until the guide 58 engages the edge 60 of the top 16. The bar 57 is then rotated in a clock-wise direction and until the flange 86 of button 85 becomes lodged beneath the under surface of the top 16. After the gage is in position the screw 81 is released and spring 68 will urge the arm 69 into engagement with the head 33 as shown in Fig. 2. The plunger 63 is then locked in position with respect to the sleeve 61 by tightening the screw 81. After the same has been tightened, wheel 74 is rotated until the lug 75 registers with the notch 76. Spring 82 then acts on the collar 83 and moves the sleeve 61 downwardly. The notch 76 and lug 75 are so proportioned that the downward movement of the said sleeve 61 is just equal to the distance that the cutting edge 25 is desired to project below the head 33. Blade 24 is next moved downwardly by rotating arm 46 with respect to the sleeve 44 until the cutting edge 25 of the same engages the arm 69 as shown in Fig. 3. Set screws 48 are then tightened and the cutter is ready to operate. The gage is then removed by loosening screw 81, depressing arm 69 and withdrawing the gage in the reverse manner from which it was applied.

The advantages of the invention are manifest. With my invention the movable blade of a doughnut machine cutter can be accurately set so as to procure the proper size and shape of the dough extrusions. By controlling the distance that the cutter blade projects below the head, sufficient override can be procured to secure positive severance of the dough extrusions. At the same time the override is not so great as to undesirably lower the upper limit of the cutter blade and thus produce ill-shapen dough extrusions. The device is easily and quickly applied and permits of rapidly adjusting the cutter blade. Adjustment of the gage can be procured to compensate for variations in the distance of the cutter head below the surface of the kettle top.

Changes in the specific form of my invention, as herein described, may be made within the scope of what is claimed without departing from the spirit of my invention.

Having described my invention, what I claim as new and desire to protect by Letters Patent is:

A gage for adjusting the position of the blade of a doughnut machine cutter with respect to the cutter head, said gage comprising a guide, a sleeve slidable in said guide, a plunger slidable in said sleeve, means for adjustably holding said plunger in said sleeve, an arm on said plunger adapted to engage said cutter head or said blade, means for locking said plunger with respect to said sleeve, a wheel rotatable on said sleeve, means restraining said wheel against axial movement in one direction on the sleeve, a lug on said wheel adapted to engage said guide, a notch formed in said guide and adapted to receive said lug and to limit relative axial movement between said sleeve and guide in a direction opposite said one direction and resilient means urging movement of said sleeve in said opposite direction to bring said lug into said notch.

ENGWARD M. LYCKE.

REFERENCES CITED

The following references are of record in the file of this patent:

UNITED STATES PATENTS

| Number | Name | Date |
|---|---|---|
| 459,107 | Geddes | Sept. 8, 1891 |
| 597,335 | Spalding | Jan. 11, 1898 |
| 1,784,093 | DeVlieg | Dec. 9, 1930 |
| 2,146,370 | Dronsfield | Feb. 7, 1939 |
| 2,213,088 | Hahn | Aug. 27, 1940 |
| 2,244,854 | Sandin | June 10, 1941 |
| 2,246,758 | Roth | June 24, 1941 |
| 2,335,513 | Hewitt | Nov. 30, 1943 |
| 2,401,085 | LaValley | May 28, 1946 |

FOREIGN PATENTS

| Number | Country | Date |
|---|---|---|
| 554,316 | Great Britain | June 29, 1943 |